United States Patent [19]

Hayashi

[11] Patent Number: 4,554,580

[45] Date of Patent: Nov. 19, 1985

[54] IMAGE INFORMATION OUTPUT APPARATUS

[75] Inventor: Masakazu Hayashi, Yokohama, Japan

[73] Assignee: Tokyo Shibaura Denki Kabushiki Kaisha, Kawasaki, Japan

[21] Appl. No.: 503,252

[22] Filed: Jun. 10, 1983

[30] Foreign Application Priority Data

Jun. 18, 1982 [JP] Japan ............... 57-150115

[51] Int. Cl.$^4$ ............... H04N 7/18
[52] U.S. Cl. ............... 358/107; 358/183
[58] Field of Search ............... 358/107, 113, 183; 340/722; 256/308

[56] References Cited

U.S. PATENT DOCUMENTS

| 3,798,366 | 3/1974 | Hunt | 358/113 |
|---|---|---|---|
| 3,820,898 | 6/1974 | Olson | 356/308 |
| 3,931,462 | 1/1976 | Exton | 358/107 |
| 4,018,986 | 4/1977 | Wilk | 358/107 |
| 4,070,692 | 1/1978 | Parks | 358/107 |
| 4,092,669 | 5/1978 | Brasnett | 358/107 |

FOREIGN PATENT DOCUMENTS 2250387 6/1973 Fed. Rep. of Germany .
2807962 9/1979 Fed. Rep. of Germany .

OTHER PUBLICATIONS

Hamamatsu Catalog, Apr. 30, 1982, p. 19.

Primary Examiner—Howard W. Britton
Attorney, Agent, or Firm—Cushman, Darby & Cushman

[57] ABSTRACT

An image information output apparatus has a position specifying section for generating a cursor line signal intended to cause two vertical cursor lines to be displayed superposed upon a picture image corresponding to an image signal of an ITV camera, and an integrator for integrating image signal components corresponding to a region between the cursor lines. The integration output signal of the integrator is converted into a measured line picture image signal, which is displayed on a monitor television device together with the picked-up image.

5 Claims, 5 Drawing Figures

IMAGE INFORMATION OUTPUT APPARATUS

BACKGROUND OF THE INVENTION

The present invention relates to an image information output apparatus, and more particularly to an image information output apparatus designed to output the luminance data of a specified region of a picked-up image so as to be superposed upon this picked-up image.

In the field of image information output apparatuses, a video measuring system has recently been developed. This video measuring system is used to set a single vertical luminance line at a given position on the image screen and to pickup image data on the vertical luminance line, thereby measuring the width or darkness and lightness of the surface of an object to be photographed. However, the prior art video measuring system is constructed such that the image data is picked up with respect to the single vertical line. Therefore, when a video camera is defective and noise is mixed into the image information, the image data of an image portion corresponding to such noise components is mixed into the image; errors thus occur in the signal processing, and a precise measurement cannot be made.

To cope with these problems the position of the vertical line is moved stepwise in the horizontal direction, and luminance data is extracted at a plurality of vertical positions, and an average value of those data is determined by, for example, a data processor which permits this value to be displayed on a monitor. However, where such countermeasures are taken, a microprocessor and a memory of large capacity are required to process the data corresponding to the plurality of vertical positions, resulting in a large and complicated video measuring apparatus as well as in an increased manufacturing cost.

SUMMARY OF THE INVENTION

Accordingly, the object of the present invention is to provide an image information output apparatus which reduces the effect of noise components, has a simple circuit construction, and which makes it possible to obtain measured image information of high quality.

According to the invention, at least two vertical lines are set on an image screen, image information components of the image region between those vertical lines are integrated for each horizontal line, the integrated value is compared with a horizontal scanning signal (sawtooth signal) and is thereby converted into a position signal on the horizontal scanning line. The conversion signal thus obtained is used to measure the darkness and lightness of the surface of an object to be photographed in the form of line data corresponding to a line perpendicular to the horizontal line of an image screen.

DETAILED DESCRIPTION OF THE PREFERRED EMBODIMENT

Figure 1:
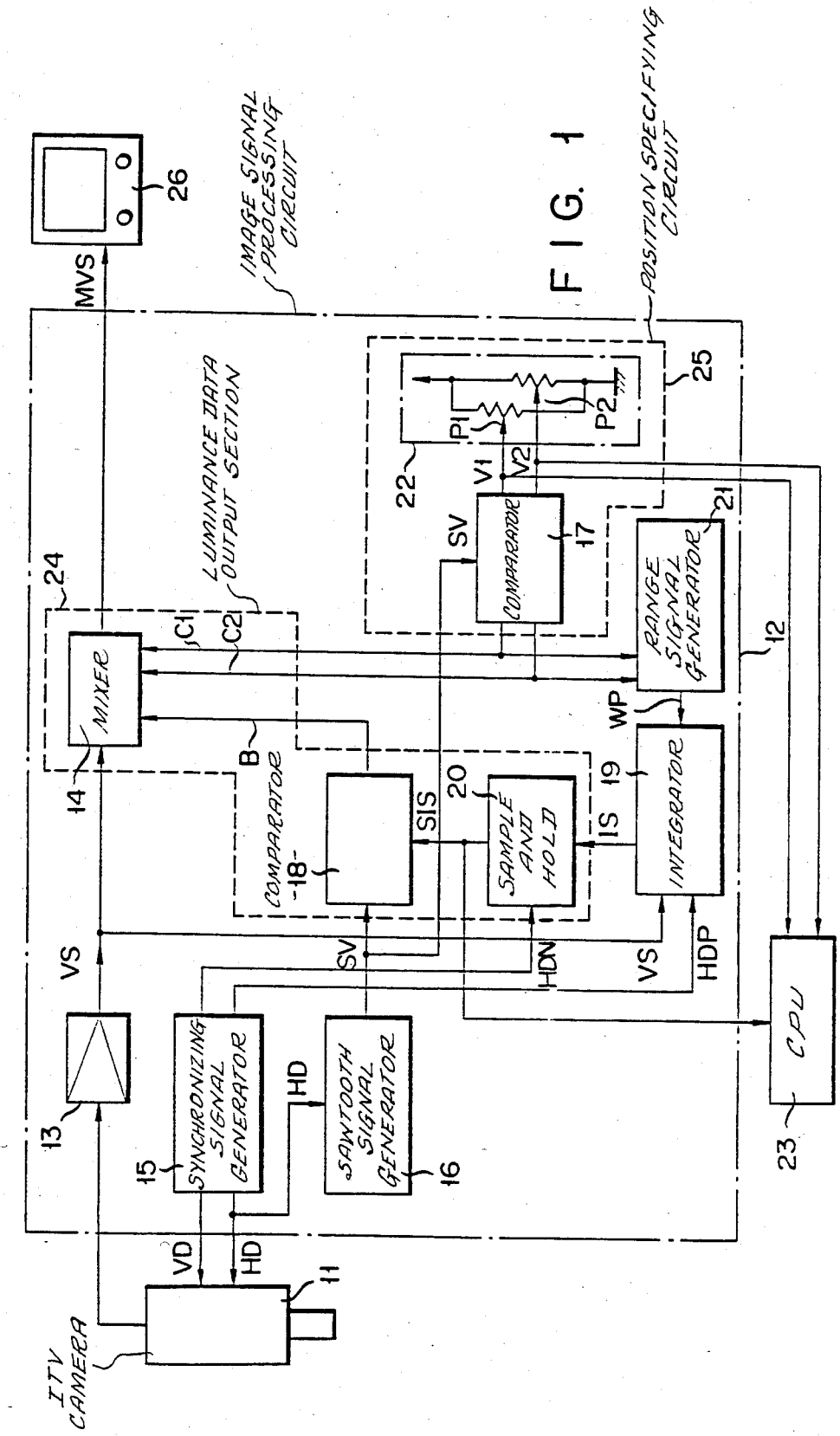
FIG. 1 is a block circuit diagram of an image information output apparatus according to an embodiment of the invention.

Referring now to FIG. 1, the image signal output terminal of an industrial television (ITV) camera 11 is connected to an input terminal of a mixer 14 through an amplifier 13 in an image signal processing circuit 12. The vertical and horizontal synchronizing signal output terminal of a synchronizing signal generator 15 are connected to the vertical and horizontal synchronizing signal input terminals of the industrical television camera. The horizontal synchronizing signal output terminal of the generator 15 is connected to the synchronizing signal input terminal of a sawtooth signal generator 16. The output terminal of the sawtooth signal generator 16 is connected to respective input terminals of comparators 17 and 18. The horizontal synchronizing pulse output terminals of the synchronizing signal generator 15 are connected to the control input terminals of an integrator 19 and a sample-and-hold circuit 20, respectively. The output terminal of the amplifier 13 is connected to the input terminal of the integrator 19. A range signal generator 21 is also connected to this integrator 19. The output terminal of the integrator 19 is connected to the input terminal of the sample-and-hold circuit 20. The output terminal of the sample-and-hold circuit 20 is connected to another input terminal of the comparator 18. The reference input terminals of the comparator 17 are connected to a potentiometer circuit 22, while the output terminals thereof are connected to the mixer 14 as well as to the range signal generator 21. The reference input terminals of the comparator 17 are also connected to a CPU 23.

The mixer 14, comparator 18 and sample-and-hold circuit 20 constitute a luminance data output section 24. Further, the comparator 17 and potentiometer circuit 22 constitute a position-specifying section 25. The mixer 14 of the luminance data output section 24 has its output terminal connected to a monitor television device 26.

Figure 2:
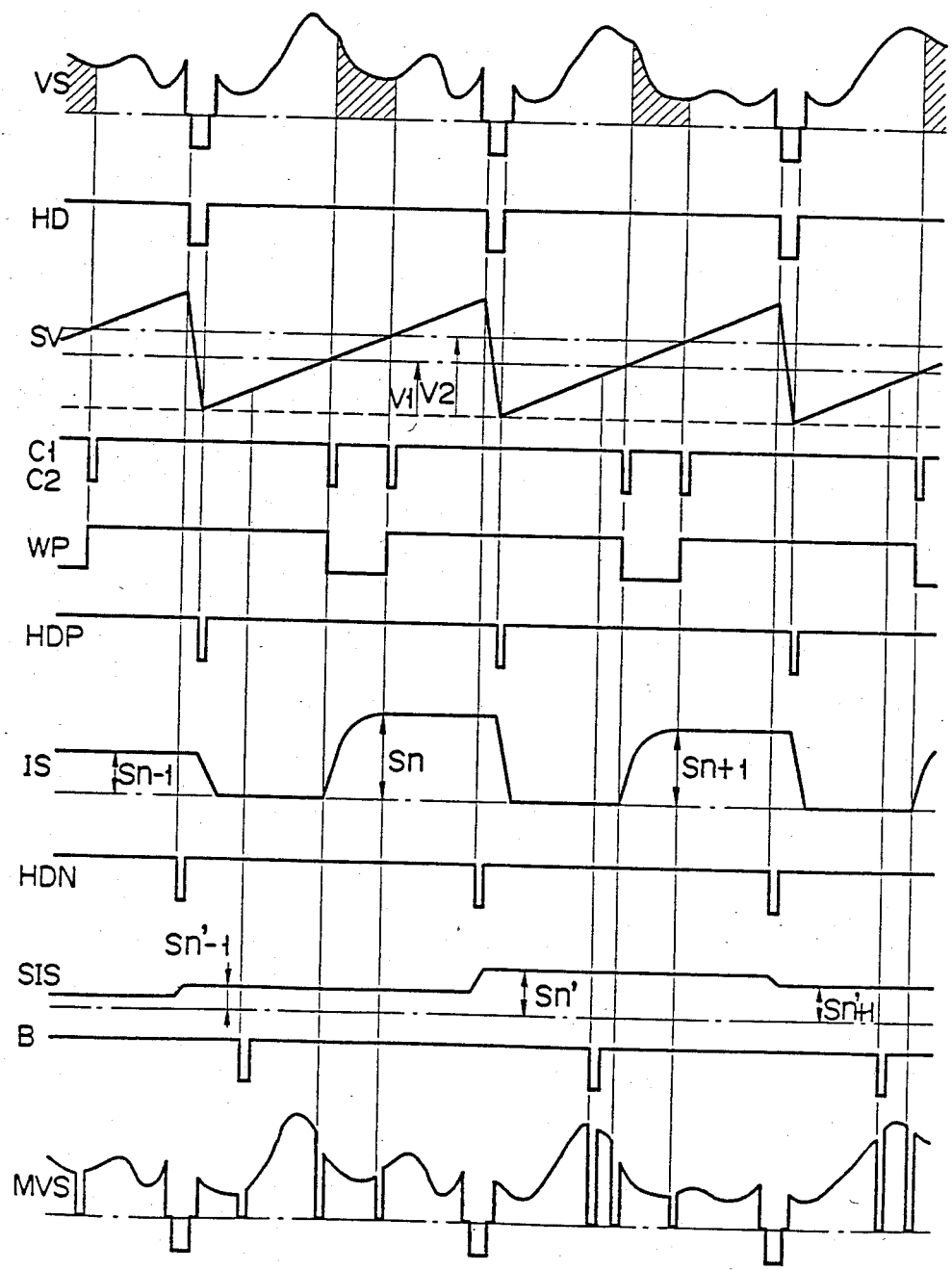
FIG. 2 is a time chart for explaining the circuit of FIG. 1.

The operation of the above-mentioned circuit will now be described in connection with the time chart of FIG. 2.

When a power source is turned on and a start switch is actuated, the synchronizing signal generator 15 supplies vertical and horizontal synchronizing signals to the ITV camera 11. When, at this time, an actual image including an object to be examined, for example, an object whose width must be measured, is photographed by the ITV camera 11, the camera 11 produces an image signal VS. The image signal VS is amplified by the amplifier 13 and is then supplied to the mixer 14 and to the integrator 19.

The sawtooth signal generator 16 generates a sawtooth signal SV in synchronization with the horizontal synchronizing signal HD. This sawtooth signal SV is supplied to the comparators 17 and 18. The comparator 17 compares the sawtooth signal SV with cursor position designation voltage signals V1, V2 and, when the voltage of the former becomes equal to the latter, produces cursor designation pulses C1 and C2. When the cursor designation pulses C1 and C2 are supplied to the range signal generator 21, this generator 21 produces a pulse signal WP having a pulse width corresponding to a period between the pulses C1 and C2. When the pulse signal WP is supplied to the integrator 19, the integrator 19 integrates the image signal VS during the period corresponding to the pulse width of the pulse signal WP and produces an integration signal IS. The integrator 19 is reset by a synchronizing pulse HDP. The synchronizing pulse HDP is generated in response to a trailing edge of the synchronizing signal HD. In contrast, a synchronizing pulse HDN is generated in response to a leading edge of the synchronizing signal HD.

When the integration output IS of the integrator 19 is supplied to the sample-and-hold circuit 20, this circuit samples and holds the integration output IS in response to the synchronizing pulse HDN up to the begining of the next horizontal scanning period and produces a sample-and-hold signal SIS. The signal levels $Sn-1'$, $Sn'$ and $Sn+1'$ of the sample-and-hold signal SIS correspond, respectively, to the levels prepared by subjecting the signal levels $Sn-1$, $Sn$ and $Sn+1$ of the integration output IS to a specified voltage reduction. When the output signal SIS of the sample-and-hold circuit 20 is supplied to the comparator 18, this signal SIS is compared with the sawtooth signal SV by the comparator 18. When the level of the sawtooth signal SV becomes equal to that of the signal SIS, the comparator 18 generates a pulse signal B.

Figure 3:
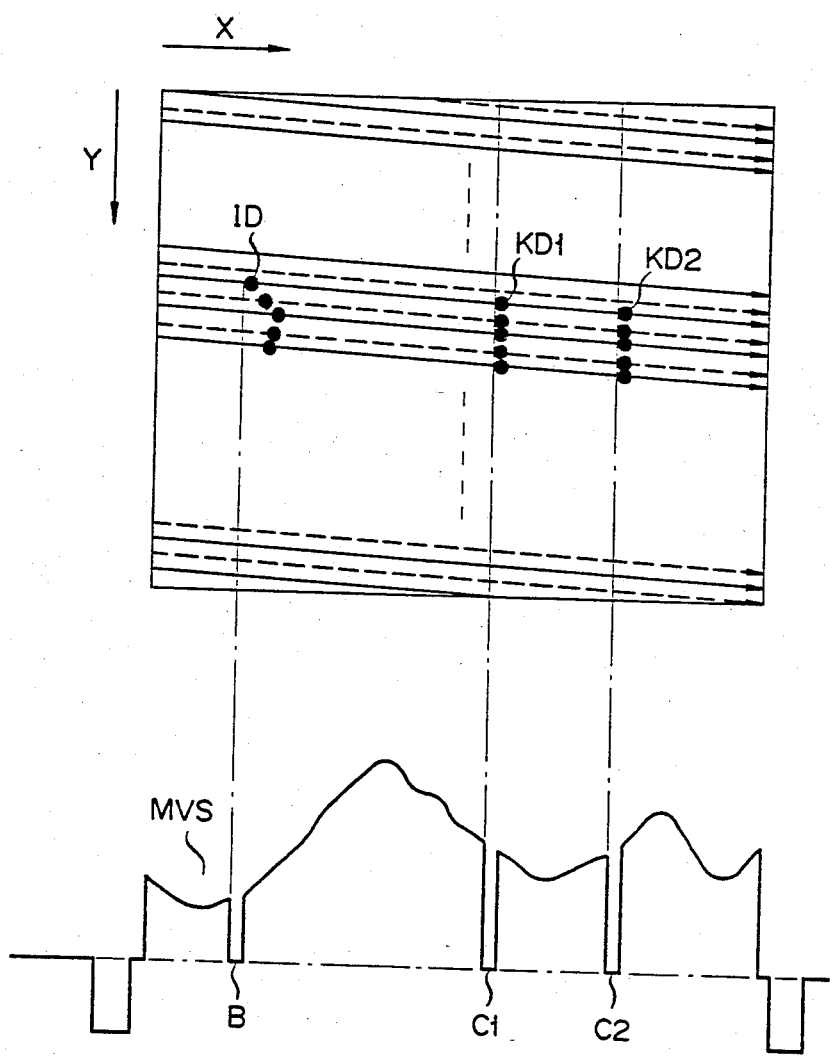
FIG. 3 shows a display of a cursor line and a measured line.
Figure 4:
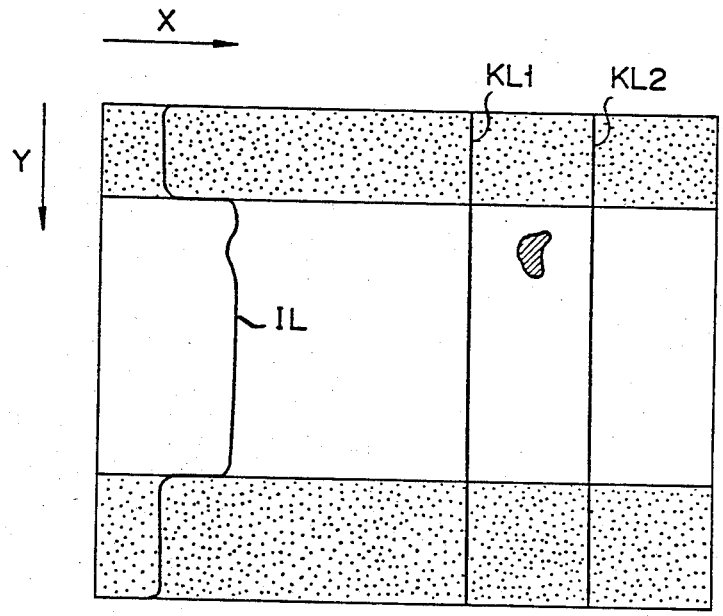
FIG. 4 shows a display surface of a monitor.

The signals B, C1 and C2 are supplied to the mixer 14 and combined with the image signal VS. The mixer 14 generates an output signal MVS, which is supplied to the monitor television device 26. In this case, as shown in FIG. 3, the black spots ID, KD1 and KD2, which correspond to pulses B, C1 and C2, are displayed on one horizontal scanning line. When the sawtooth signal SV corresponding to the next horizontal scanning line is supplied to the comparators 17 and 18, these black spots ID, KD1 and KD2 are then displayed on this next horizontal scanning line. If the device 26 is of an interlace system, the black spots are displayed on every second horizontal scanning line, and vertical cursor lines KL1 and KL2 and a measured line IL, which corresponds to the integrated value of luminance data representing the luminance of the region between lines KL1 and KL2, are also displayed, as shown in FIG. 4. When the cursor lines KL1 and KL2 on the device 26 are viewed and it is desired to change their positions, the potentiometers P1 and P2 of the potentiometer circuit 22 are adjusted. The cursor position designation voltages V1 and V2 are thus varied, thereby moving the lines KL1 and KL2, respectively, to their desired positions.

The difference between the voltages V1 and V2 corresponds to a distance between the cursor lines KL1 and KL2. The integrator 19 integrates the luminance data, and the value obtained by this integration is displayed as the measured line IL on the display screen. Even when an image of noise components is mixed between the lines KL1 and KL2, the noise components do not largely affect the value of the output from the integrator 19. The measured line IL is therefore displayed as a line substantially unaffected by the noise.

Figure 5:
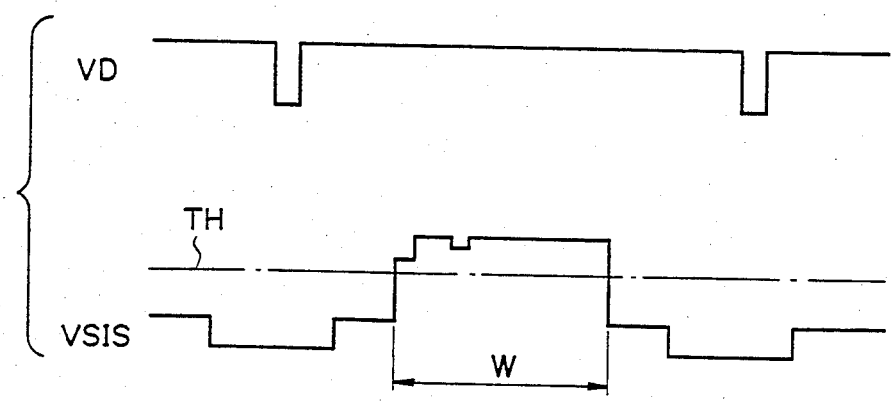
FIG. 5 shows a time chart of a vertical synchronising signal and a measured line image signal.

When the data of the measured line IL, i.e., the output signal SIS of the circuit 20, is supplied to the CPU 23, the CPU 23 calculates the width of the object. In calculating the width of the object, as shown in FIG. 5, a measured line image signal VSIS obtained during the period between two adjacent vertical sync pulses VD is binary coded, using the threshold voltage TH as the reference. The period of time, which corresponds to the width W, is measured by counting clock pulses. The count CNT thus obtained is multiplied by an optical coefficient k. The width W is thus given as follows:

$$W = k \cdot CNT$$

The voltages V1 and V2 from the potentiometer circuit 22 are applied to the CPU 23. From these voltages V1 and V2 the CPU 23 determines the positions of the cursor lines KL1 and KL2 on the display screen. If the image of the object is on either the left or right section of the display screen, the CPU 23 determines whether or not the cursor lines KL1 and KL2 overlap the image of the object.

The difference between the voltages V1 and V2 corresponds to the gain of the signal VSIS. Hence, the threshold voltage TH is changed according to the difference between the voltages V1 and V2, thereby keeping the ratio of the voltage TH to the signal VSIS constant. Since this ratio remains constant, the width of the object can be accurately measured, and is not affected by the movement of the cursor lines KL1 and KL2 on the display screen.

As mentioned above, according to the invention, the luminance data of the image region defined between the two vertical cursor lines KL1 and KL2 is integrated and the resultant integrated value is displayed as measured data, and therefore, even if noise components are mixed into the image, the measured data is almost unaffected by such noise components, with the result that high quality measured data is obtained. In addition, the signal processing can be effected for a period of time substantially equal to that required for the scanning of the ITV camera, which is advantageous in using the apparatus. Further, since, according to the invention, the integration and signal generation can be effected by relatively simple circuits, the resultant image display control apparatus becomes not only simpler in construction than the prior art apparatus, but also smaller and cheaper to manufacture.

In the above-mentioned embodiment, the vertical cursor lines KL1 and KL2 and the measure data line IL are displayed as black lines. However, these lines may be displayed as white lines. In this case, positive pulses are combined with the image signal as the pulses B, C1 and C2. Further, vertical cursor lines KL1 and KL2 may be displayed as black lines while the measured data line IL is displayed as a white line. When the display is made in such a manner, it becomes easy to visually discriminate the data. Where such visual data recognition is not necessary, any of the pulses B, C1 and C2 may be excluded from the image signal. Further, the photographing device is not limited to an ITV camera, but may comprise, for example, a sensor using a two-dimensional solid image pickup element. Various modifications may be made in the scanning system as well as in the construction of the monitor.

What is claimed is:

1. An image information output apparatus, comprising:
   synchronizing signal generator means for generating horizontal and vertical synchronizing signals;
   image pickup means, responsive to said synchronizing signals, for generating an image signal corresponding to an object image;
   sawtooth signal generator means for generating a sawtooth signal in synchronization with said horizontal synchronizing signal;
   cursor line means for superposing at least two vertical lines on said object image so as to be included in said image signal, and having means for outputting cursor voltages and for producing cursor signals in cooperation with said sawtooth signal, which cursor signals correspond to said vertical lines;

integrating means for integrating components of said image signal corresponding to a region between said two vertical lines, and for outputting an integration signal indicative thereof;

image signal output means for converting said integration signal into a brightness signal in comparison with the level of said sawtooth signal;

mixer means for mixing said brightness signal with said image signal; and display means for displaying cursor vertical lines based on said cursor signals, a detection vertical line based on said brightness signal and said object image based on said image signal.

2. An image information output apparatus according to claim 1, wherein said integrating means includes means for integrating said image signal in response to a signal corresponding to the leading edge of at least one of said synchronizing signals; and said converting means includes sample-and-hold means for holding said integration signal in response to a signal corresponding to the trailing edge of said at least one sychronizing signal.

3. An image information output apparatus according to claim 1, wherein said cursor voltage output means includes potentiometer means having a pair of potentiometers for respectively outputting said two cursor voltages.

4. An image information output apparatus according to claim 2, wherein said at least one synchronizing signal is associated with a horizontal scanning period of said image pickup means; and said image signal output means includes means for comparing the level of said integration signal held by said sample-and-hold means with the varying level of said sawtooth signal and thereby outputting said brightness signal.

5. An image information output apparatus according to claim 1, wherein said apparatus includes means for calculating the size of an object in said object image on the basis of said integration signal.

* * * * *

UNITED STATES PATENT AND TRADEMARK OFFICE
CERTIFICATE OF CORRECTION

PATENT NO. : 4,554,580

DATED : November 19, 1985

INVENTOR(S) : Masakazu Hayashi

It is certified that error appears in the above-identified patent and that said Letters Patent is hereby corrected as shown below:

-- [30] Foreign Application Priority Data

June 18, 1982      Japan ..... 57-105115   --.

Signed and Sealed this

Thirteenth Day of May 1986

[SEAL]

Attest:

DONALD J. QUIGG

Attesting Officer

Commissioner of Patents and Trademarks